(No Model.)
L. M. DEVORE.
HANDLE.
No. 401,419. Patented Apr. 16, 1889.
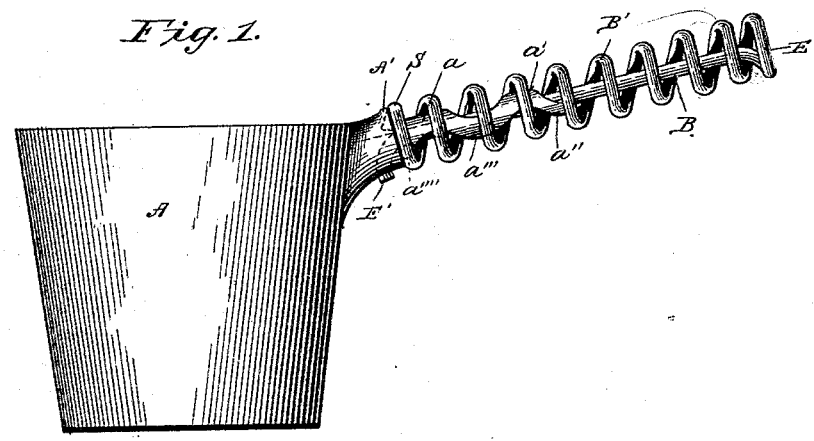
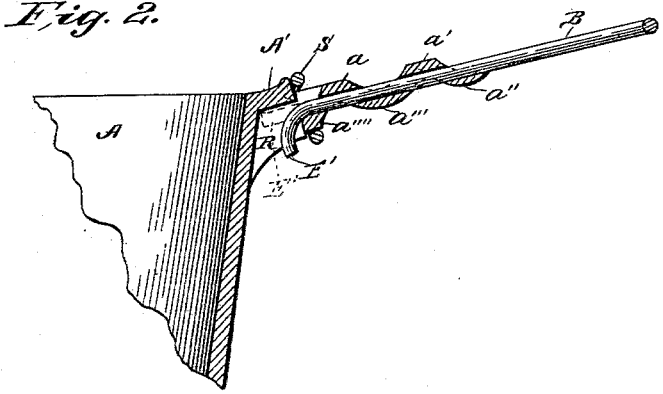
Witnesses,
Inventor,
Levi M. Devore
By Niles & Greene,
Attorneys

UNITED STATES PATENT OFFICE.

LEVI M. DEVORE, OF FREEPORT, ILLINOIS.

HANDLE.

SPECIFICATION forming part of Letters Patent No. 401,419, dated April 16, 1889.

Application filed January 8, 1889. Serial No. 295,793. (No model.)

*To all whom it may concern:*

Be it known that I, LEVI M. DEVORE, a resident of Freeport, in the county of Stephenson and State of Illinois, have invented certain new and useful Improvements in Handles; and I do hereby declare the following to be a full, clear, and exact description of the invention, such as will enable others skilled in the art to which it pertains to make and use the same.

My invention relates to improvements in handles adapted to be applied to implements of various kinds, but more particularly to those which are liable to become heated in using—such, for instance, as cooking utensils, fire-shovels, and stove-lid lifters—the object of the invention being to provide such implements and utensils with handles that are not likely to become heated in any ordinary use.

The invention is fully described and explained in this specification and shown in the accompanying drawings, in which—

Figure 1 is a side elevation of a cooking utensil provided with my improved handle. Fig. 2 is a central vertical section showing the connection of the handle with the body of the cooking utensil.

In the views, A is the body of an ordinary stew-pan or other similar cooking-vessel, and A' is a boss or shoulder formed integrally therewith and adapted to receive the abutting end of a spiral spring forming the principal part of the handle. A series of clasps, $a\ a'\ a''\ a'''\ a''''$, formed integrally with each other and with the boss and body of the utensil, form together an elongated socket whose axis is coincident with the axis of the handle. The boss and socket support the handle proper, which is formed from a single wire, a portion of which is a straight rod, B, while the remainder is formed into a spiral coil, B', inclosing the straight rod, which is preferably coincident with the axis of the spiral. The straight rod and the spiral are continuous with each other at what I shall call the "outer end," E, of the handle, the opposite end coil, S, of the spiral and the opposite end, E', of the rod being free from each other. The handle is connected with the utensil by passing the free end E' of the rod in the socket formed by the clasps $a\ a'\ a''\ a'''\ a''''$ until the end coil, S, of the spiral is pressed against the face of the boss A' when the free end of the rod reaches the position shown in dotted lines in Fig. 2. The end is then bent down about the clasp $a''''$, as shown in full lines in Fig. 2 and in dotted lines in Fig. 1, when the handle is securely fastened to the utensil. The long bearing afforded by the socket in which the rod B rests gives the handle great strength and stiffness against lateral pressure, and the open form of the handle gives it very little heat-conducting material in comparison with its radiating-surface, so that it is practically impossible to heat the handle by heating the utensil to which it is attached. At the same time the integral connection of the rod with the spiral at the outer end of the handle makes it smooth and gives it a convenient shape and a neat and workmanlike appearance. I have found it advisable in attaching the handle, as before described, to slightly compress the spiral lengthwise before bending the end E' of the rod in the manner shown, so that the entire handle, when in use, is under tension. This adds somewhat to the rigidity of the handle, and also prevents any jar or rattle of the parts when in use.

It is evident that the socket which receives the rod B may be formed of a different number of clasps from that shown, or may be drilled or cast or bent from sheet metal in a continuous tube; but I prefer the form shown in the drawings, as it can be cast without coring and is the cheapest form in which it can be made. The form of the end E' of the rod is not material, as it is only necessary that it be so connected with the utensil or implement, or with an attachment or projection therefrom, that the handle cannot be accidentally withdrawn after being once placed in operative position.

It is evident that the form of the implement or utensil to which my improved handle is attached constitutes no part of this invention, the handle being made up of the spiral coil with its central rod, the elongated bearing or socket receiving the central rod, and the boss against which the free end of the spiral abuts, the form of the article to which the boss is attached or on which it is formed being discretionary with the manufacturer.

Having now described and explained my invention, what I claim as new, and desire to secure by Letters Patent, is—

1. In a handle of the class described, the combination, with a spiral coil and an integrally-formed rod lying within the same, of a suitable boss adapted to receive the free end of the spiral, and an elongated bearing attached to the boss and receiving and supporting the free end of said rod, substantially as and for the purpose set forth.

2. The combination of the boss A' and the clasps $a$ $a'$ $a''$ $a'''$ $a''''$, formed integrally therewith and making up a socket, the coil B', abutting against the boss A', and the rod B, seated in the socket and having its end E' bent to prevent withdrawal of the rod from the socket, substantially as and for the purpose set forth.

In testimony whereof I have signed this specification in the presence of two subscribing witnesses.

LEVI M. DEVORE.

Witnesses:
R. H. WILES,
J. GOULD.